US009010701B1

(12) United States Patent
Cooper

(10) Patent No.: US 9,010,701 B1
(45) Date of Patent: Apr. 21, 2015

(54) PORTABLE AND COLLAPSIBLE STAND FOR SUPPORTING AN OBJECT

(71) Applicant: Coopercopia, LLC, Nashville, TN (US)

(72) Inventor: Daniel Lee Cooper, Nashville, TN (US)

(73) Assignee: Coopercopia, LLC, Nashville, TN (US)

( * ) Notice: Subject to any disclaimer, the term of this patent is extended or adjusted under 35 U.S.C. 154(b) by 0 days.

(21) Appl. No.: 14/191,931

(22) Filed: Feb. 27, 2014

Related U.S. Application Data

(60) Provisional application No. 61/779,277, filed on Mar. 13, 2013.

(51) Int. Cl.
*F16M 11/38* (2006.01)
*G10G 5/00* (2006.01)
*F16M 11/26* (2006.01)
*A47B 23/04* (2006.01)
*F16M 11/34* (2006.01)

(52) U.S. Cl.
CPC .............. *F16M 11/26* (2013.01); *A47B 23/042* (2013.01); *A47B 23/043* (2013.01); *G10G 5/00* (2013.01); *F16M 2200/08* (2013.01); *F16M 11/34* (2013.01); *F16M 11/38* (2013.01)

(58) Field of Classification Search
CPC ......... G10G 5/00; F16M 11/34; F16M 11/38; F16M 2200/08; A47B 23/042
USPC .............. 248/441.1, 443, 447, 459, 460, 462, 248/463, 465, 166, 346.07, 346.3, 165, 248/150; 84/327, 329, 453; D14/447
See application file for complete search history.

(56) References Cited

U.S. PATENT DOCUMENTS

| | | | |
|---|---|---|---|
| 1,840,620 A * | 1/1932 | Dennis | 248/462 |
| 3,057,591 A | 10/1962 | Weimer | |
| 3,417,954 A | 12/1968 | Croninger | |
| 4,943,021 A | 7/1990 | Cien et al. | |
| 5,350,143 A | 9/1994 | Hoshino | |
| 5,383,634 A | 1/1995 | Liao | |
| 5,505,413 A * | 4/1996 | Hennessey | 248/166 |
| 5,511,758 A * | 4/1996 | Hsu | 248/461 |
| 5,664,756 A | 9/1997 | Liao | |
| 5,744,735 A | 4/1998 | Liao | |
| 5,836,552 A | 11/1998 | Yu | |
| 5,957,417 A | 9/1999 | Yu | |
| 5,973,244 A * | 10/1999 | McCulloch | 84/327 |
| 6,017,012 A * | 1/2000 | Henson, Jr. | 248/460 |
| D436,465 S | 1/2001 | Berkman | |
| 6,323,406 B1 * | 11/2001 | Park | 84/327 |

(Continued)

*Primary Examiner* — Tan Le
(74) *Attorney, Agent, or Firm* — Stites & Harbison, PLLC; David W. Nagle, Jr.; James R. Hayne

(57) ABSTRACT

A stand for supporting an object comprises: a first main support leg; a second main support leg; a first vertical support member pivotally connected to the first main support leg; and a second vertical support member pivotally connected to the second main support leg, such that first and second vertical support members can be rotated relative to the first and second main support legs to configure the stand in a storage position or a deployed position. The stand further comprises a hinge that operably joins the first vertical support member to the second vertical support member. The stand further comprises a first rear leg configured for sliding movement relative to the first main support leg between a retracted position and an extended position; and a second rear leg configured for sliding movement relative to the second main support leg between a refracted position and an extended position.

18 Claims, 11 Drawing Sheets

(56) References Cited

U.S. PATENT DOCUMENTS

| | | |
|---|---|---|
| 6,412,742 B1 | 7/2002 | Yu |
| 6,439,532 B1 * | 8/2002 | Yu ................................ 248/443 |
| 6,533,228 B1 | 3/2003 | Yu |
| D482,904 S | 12/2003 | Slaymaker |
| 6,722,617 B2 | 4/2004 | Wilfer |
| 7,470,843 B2 * | 12/2008 | Hsieh .............................. 84/329 |
| 7,777,110 B2 | 8/2010 | Wallis |
| 7,798,530 B1 | 9/2010 | Mercado |
| 8,146,870 B1 * | 4/2012 | Cooper ......................... 248/166 |
| 2005/0121567 A1 | 6/2005 | Meuniot |
| 2009/0284963 A1 * | 11/2009 | Intravatola .................... 362/190 |

\* cited by examiner

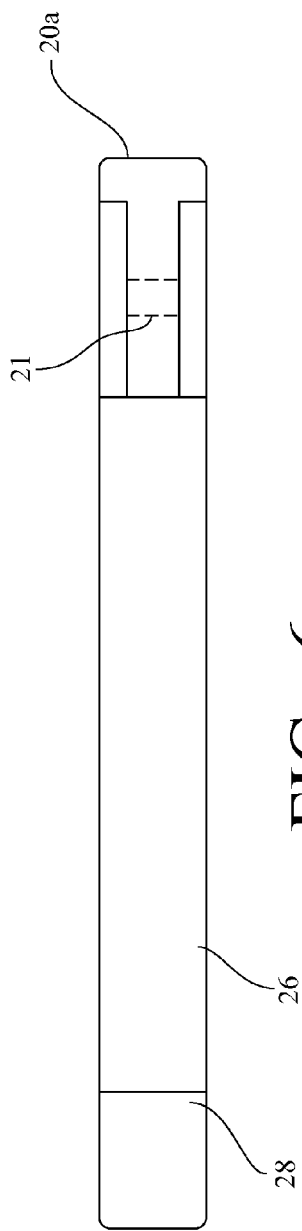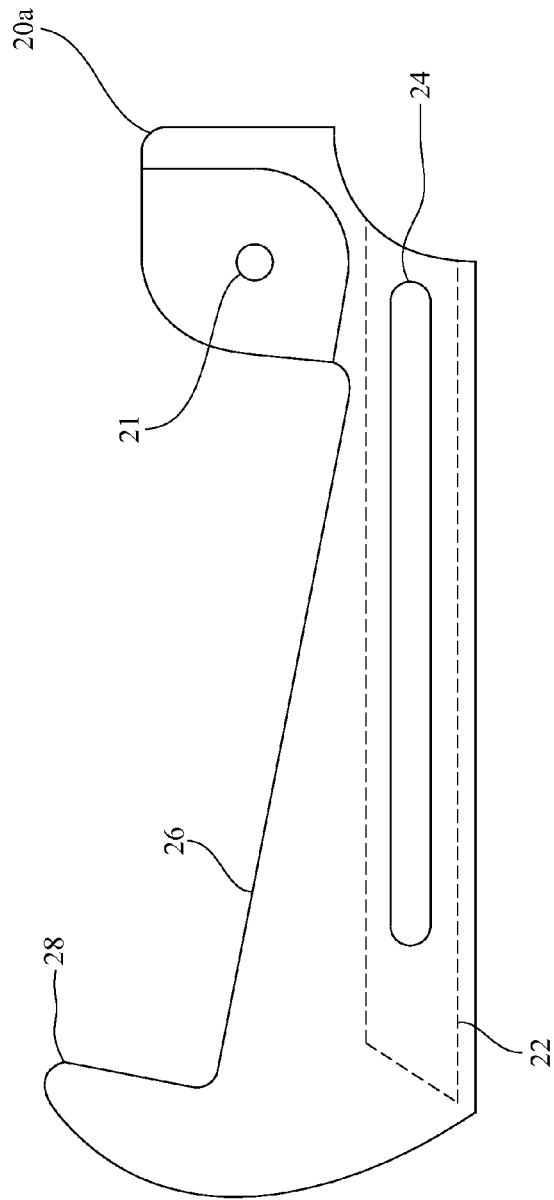

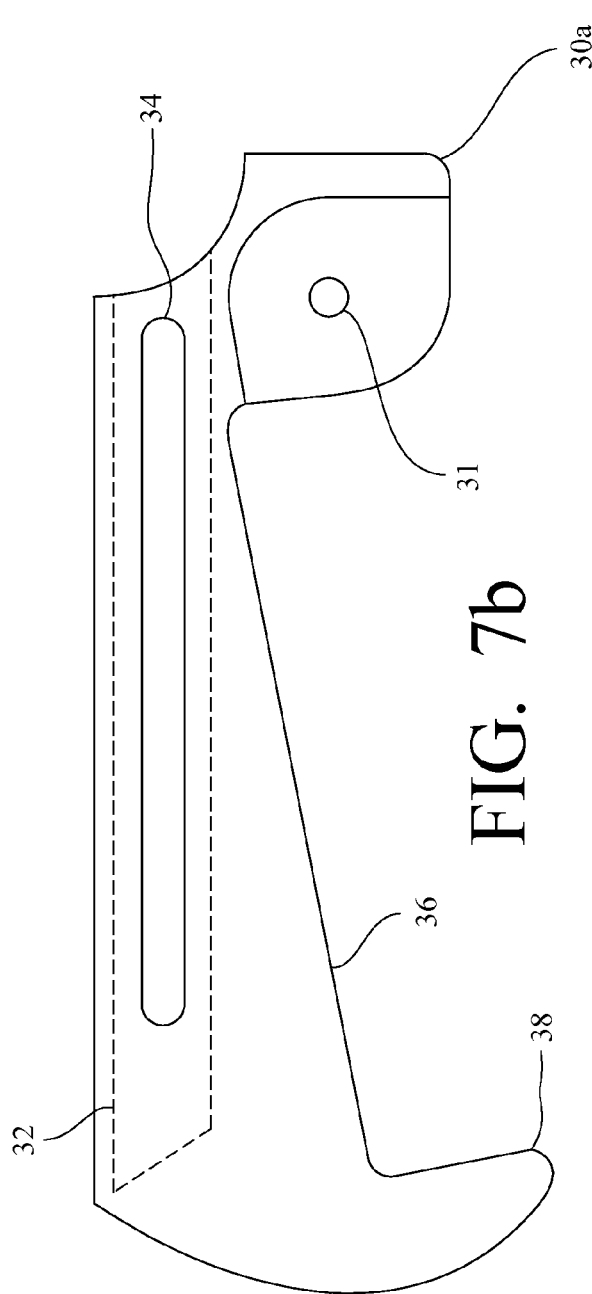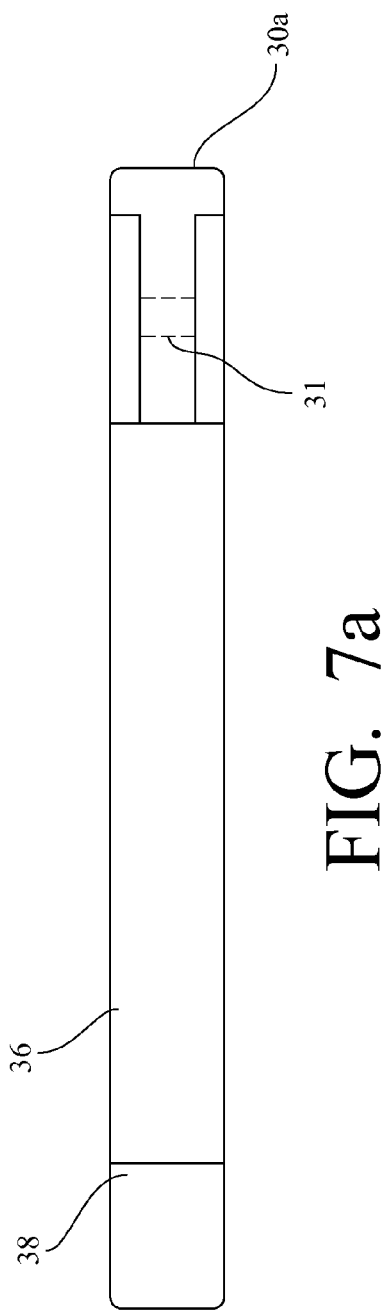
FIG. 7b
FIG. 7a

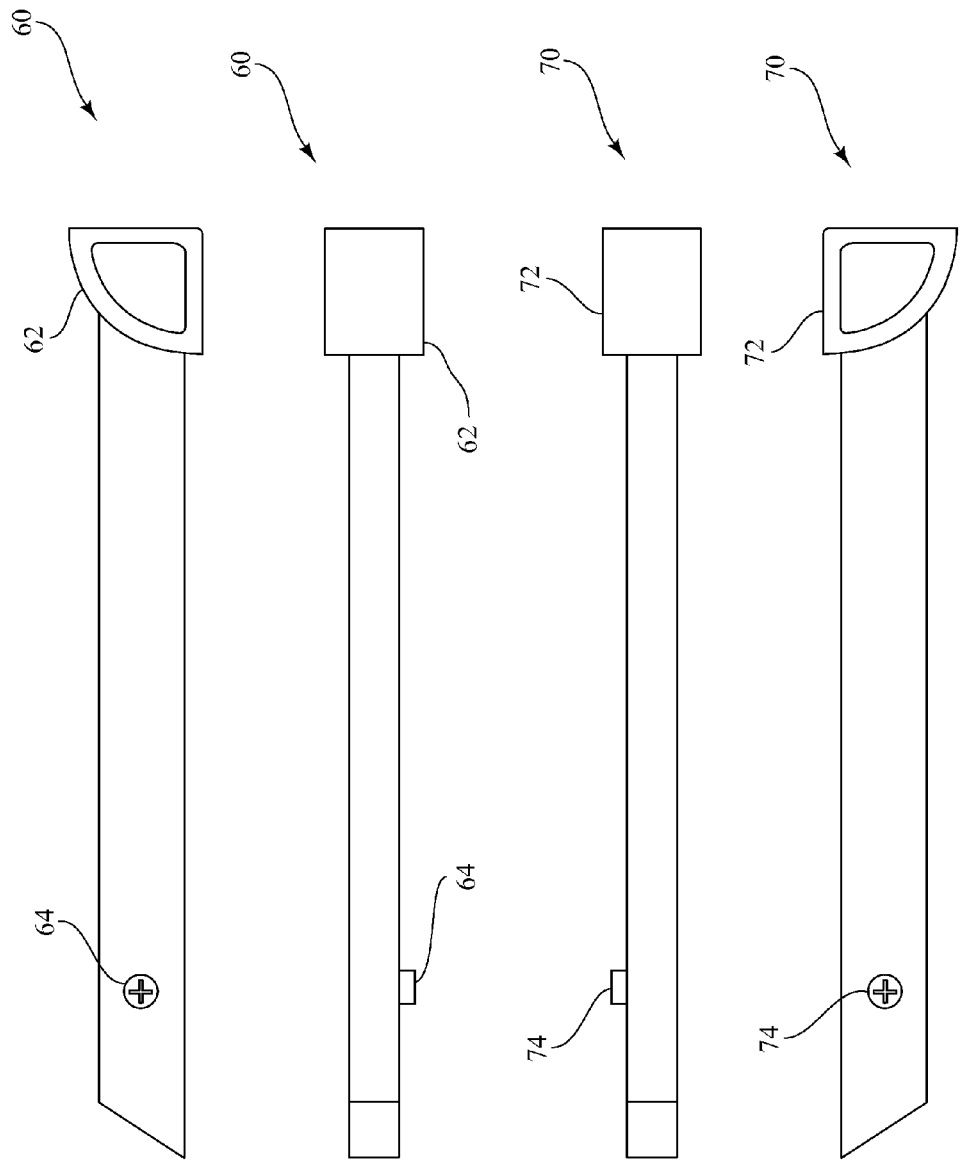

PORTABLE AND COLLAPSIBLE STAND FOR SUPPORTING AN OBJECT

CROSS-REFERENCE TO RELATED APPLICATIONS

The present application claims priority to U.S. Provisional Patent Application Ser. No. 61/779,277 filed on Mar. 13, 2013, the entire disclosure of which is incorporated herein by reference.

BACKGROUND OF THE INVENTION

The present invention relates to a portable and collapsible stand for supporting an object. Numerous stands exist in the art for holding multiple types of objects, including, for example, photographs, artwork, and musical instruments. With the recent introduction of tablet computers into the marketplace, stands are often also used to support a tablet computer in a generally upright position for ready viewing of the display.

With respect to such stands, their utility is often increased if they are portable. In other words, it is desirable to have a stand that can be folded or collapsed for storage and transport.

For instance, in co-pending and commonly assigned U.S. patent application Ser. No. 12/836,764, which is incorporated herein by reference, a foldable guitar stand is described that includes: two main support legs; two vertical support members; two rear legs; and a brace.

Each of the main support legs includes a proximate end that defines a hole to facilitate pivotal movement of the main support leg relative to the associated vertical support member. Each main support leg also defines a recess along its inner surface at its proximate end, which engages and mates with a complementary recess defined by an associated rear leg when the guitar stand is in a storage position. Each main support leg further includes a substantially flat foot portion at its distal end that engages the underlying ground surface when the guitar stand is in a deployed position. Each main support leg also defines two support ledges along its upper surface, which terminate at a stop at the distal end of the main support leg. Furthermore, the area above the support ledges effectively defines a cavity for receiving the associated vertical support member when the guitar stand is in a storage position.

Each vertical support member has an enlarged and flattened proximate end that defines a hole. This hole is placed in registry with the corresponding hole defined through the associated main support leg. At the opposite end of each vertical support member, there is a hinge portion that is secured to the inner surface of the vertical support member. The hinge portion secured to the first vertical support member is operably connected to and engages the hinge portion secured to the second vertical support member to create a butt hinge that facilitates pivotal movement of the respective vertical support members relative to one another.

Each rear leg has an enlarged and flattened proximate end that defines a hole. This hole is placed in registry with the hole defined through the associated main support leg and the hole defined through the associated vertical support member, such that a pin can be inserted through the respective holes to facilitate pivotal movement. In this regard, the enlarged and flattened proximate end of each rear leg is interposed and effectively "sandwiched" between the associated main support leg and the enlarged and flattened proximate end of the associated vertical support member. Thus, with respect to one side of the exemplary stand, all three of the major structural components—the main support leg, the vertical support member, and the rear leg (collectively, a first subassembly)—pivot relative to each other about a common axis defined by a first pin. Similarly, with respect to the other side of the exemplary stand, all three of the major structural components—the main support leg, the vertical support member, and the rear leg (collectively, a second subassembly)—pivot relative to each other about a common axis defined by a second pin.

Furthermore, each rear leg also includes a foot portion at its distal end. Each rear leg also defines a recess along its outer surface that extends from the proximate end to the distal end. This recess engages and mates with a complementary recess defined by the main support leg when the guitar stand is in a storage position.

Finally, the brace extends between and connects the vertical support members.

In a deployed position, each of the main support legs is rotated about the respective axes defined by the pins to a position in which a substantially flat foot portion at the respective distal ends of the main support legs can engage the underlying ground surface. At the same time, each of the rear legs is rotated away from the associated main support leg to a position in which the foot portion can engage the underlying ground surface. The two vertical support members (which are hinged together) are then rotated into an upright orientation. Finally, the guitar stand can be spread open, with the brace used to fix the guitar stand into the deployed position. Once in the deployed position, the exemplary stand provides a stable support for a guitar or other instrument.

To return the guitar stand to a storage position, the brace is unlocked or released. The two vertical support members (which are hinged together) are folded together into an abutting relationship, and then are rotated downward and are received in the cavities defined above the respective support ledges of the main support legs. The rear legs are then rotated toward and into engagement with the respective main support leg. Specifically, the recess defined along the outer surface of each rear leg engages and mates with the complementary recess defined by the associated main support leg, such that each rear leg is nestled into and fits snugly against the associated main support leg. Once in the storage position, the exemplary stand can fit in the space that is in front of the neck support and under the headstock of the guitar when it is stored in the guitar case.

However, there remains a need for similar stands for providing stable support to other objects that can be folded or collapsed for storage and transport.

SUMMARY OF THE INVENTION

The present invention is a portable and collapsible stand for supporting an object.

An exemplary stand includes: two main support legs; two vertical support members; and two rear legs.

In some embodiments, each of the main support legs includes a proximate end that defines a hole to facilitate pivotal movement of each main support leg relative to one of the vertical support members. Each main support leg also defines an internal cavity for receiving one of the rear legs, along with a slot defined in the lateral surface of each main support leg and adjacent to the internal cavity. Each of the main support legs also defines a support ledge along its upper surface, which terminates at a stop at the distal end of the main support leg. The area above the support ledge effectively defines a cavity for receiving one of the vertical support members when the stand is in a storage position.

In some embodiments, each of the vertical support members has an enlarged end that forms a clevis, with a hole defined through the clevis. The clevis formed by the enlarged end engages one of the main support legs, with the hole being placed in registry with the corresponding hole defined through the main support leg, such that a pin can be inserted through the respective holes to facilitate pivotal movement of the main support leg relative to the vertical support member. At the opposite end of each vertical support member, there is a hinge portion that is secured to the inner surface of the vertical support member. As part of the assembly of the stand, the hinge portion secured to the first vertical support member is operably connected to and engages the hinge portion secured to the second vertical support member to create a hinge that facilitates pivotal movement of the respective vertical support members relative to one another.

In some embodiments, each of the rear legs is an elongated member that terminates in a foot. A stop extends from a lateral surface of each rear leg. Each rear leg is received in the internal cavity defined by one of the main support legs and is configured for sliding movement with respect to the main support leg. The stop of each rear leg is received in the slot defined in the lateral surface of the main support leg, thus controlling and restricting the sliding movement of each rear leg with respect to the main support leg.

Thus, on one side of the stand, one of the main support legs and one of the vertical support members pivot with respect to one another. Similarly, on the other side of the stand, the other main support leg and the other vertical support member pivot with respect to one another. The two sides of the stand are then operably joined by the above-described hinge that connects the respective ends of the vertical support members. Furthermore, in some embodiments, a brace extends between and connects the vertical support members.

In a deployed position, each of the main support legs is rotated to a position in which the main support legs engage the underlying ground surface. At the same time, the two vertical support members (which are hinged together) are rotated into an upright orientation. Each of the rear legs is then manipulated into the extended position. Finally, the stand can be spread open, with the brace used to fix the stand into the deployed position. Once in the deployed position, the stand provides a stable support for an object, such as a tablet computer.

To return the stand to a storage position, the brace is unlocked or released. The two vertical support members (which are hinged together) are folded together into an abutting relationship, and then are rotated downward and are received in the cavities defined above the respective support ledges of the main support legs. The rear legs are manipulated to the retracted position.

DESCRIPTION OF THE DRAWINGS

FIGS. 6a and 6b are views of one of the main support legs of the exemplary stand of FIG. 1;

FIGS. 7a and 7b are views of another of the main support legs of the exemplary stand of FIG. 1;

FIGS. 8a and 8b are views of one of the rear legs of the exemplary stand of FIG. 1;

FIGS. 9a and 9b are views of another of the rear legs of the exemplary stand of FIG. 1;

DETAILED DESCRIPTION OF THE INVENTION

The present invention is a portable and collapsible stand for supporting an object.

Figures 1, 2:
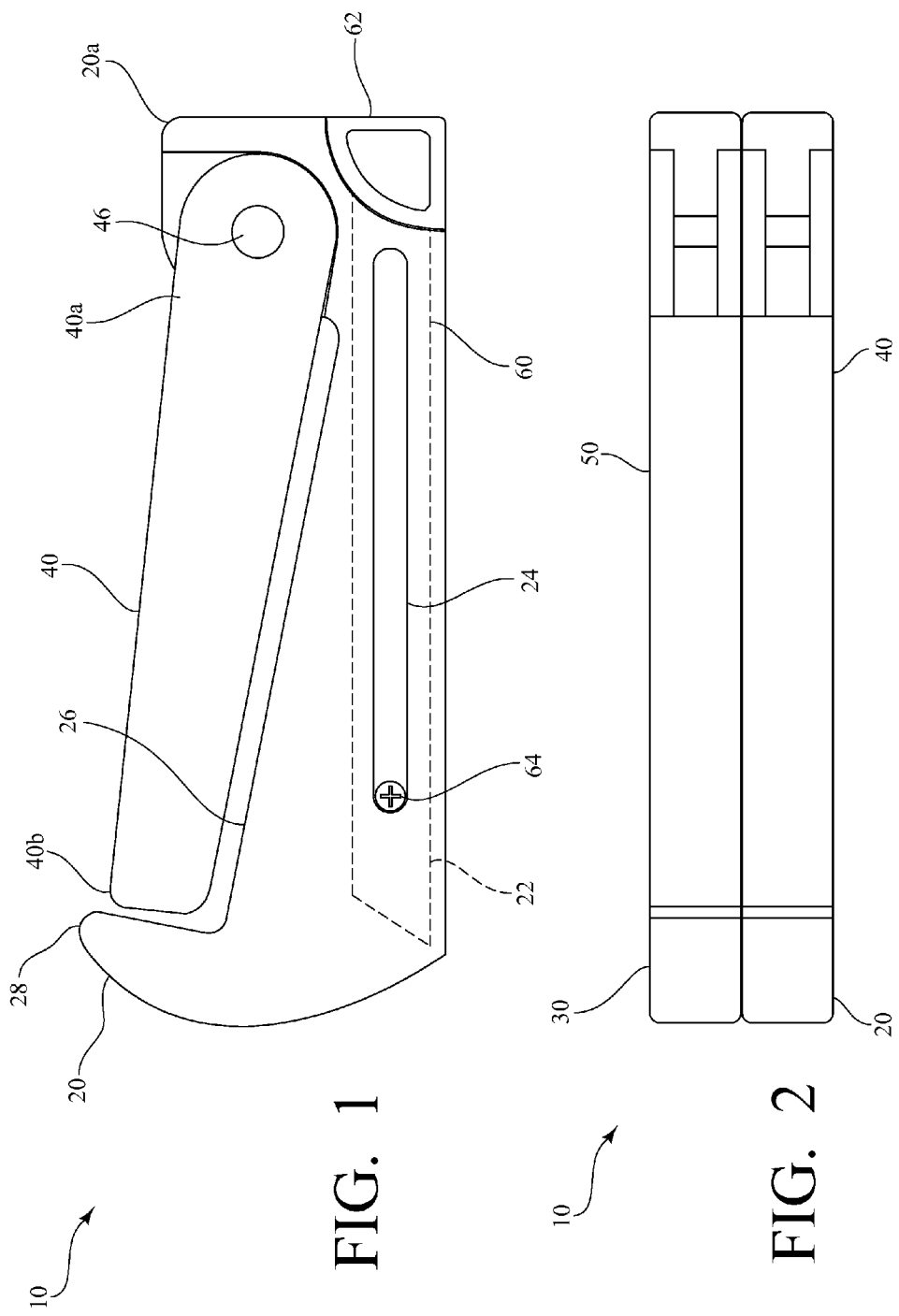
FIG. 1 is a side view of an exemplary portable and collapsible stand made in accordance with the present invention in a collapsed state or storage position.
FIG. 2 is a top view of the exemplary stand of FIG. 1 in the collapsed state or storage position.
Figure 3:
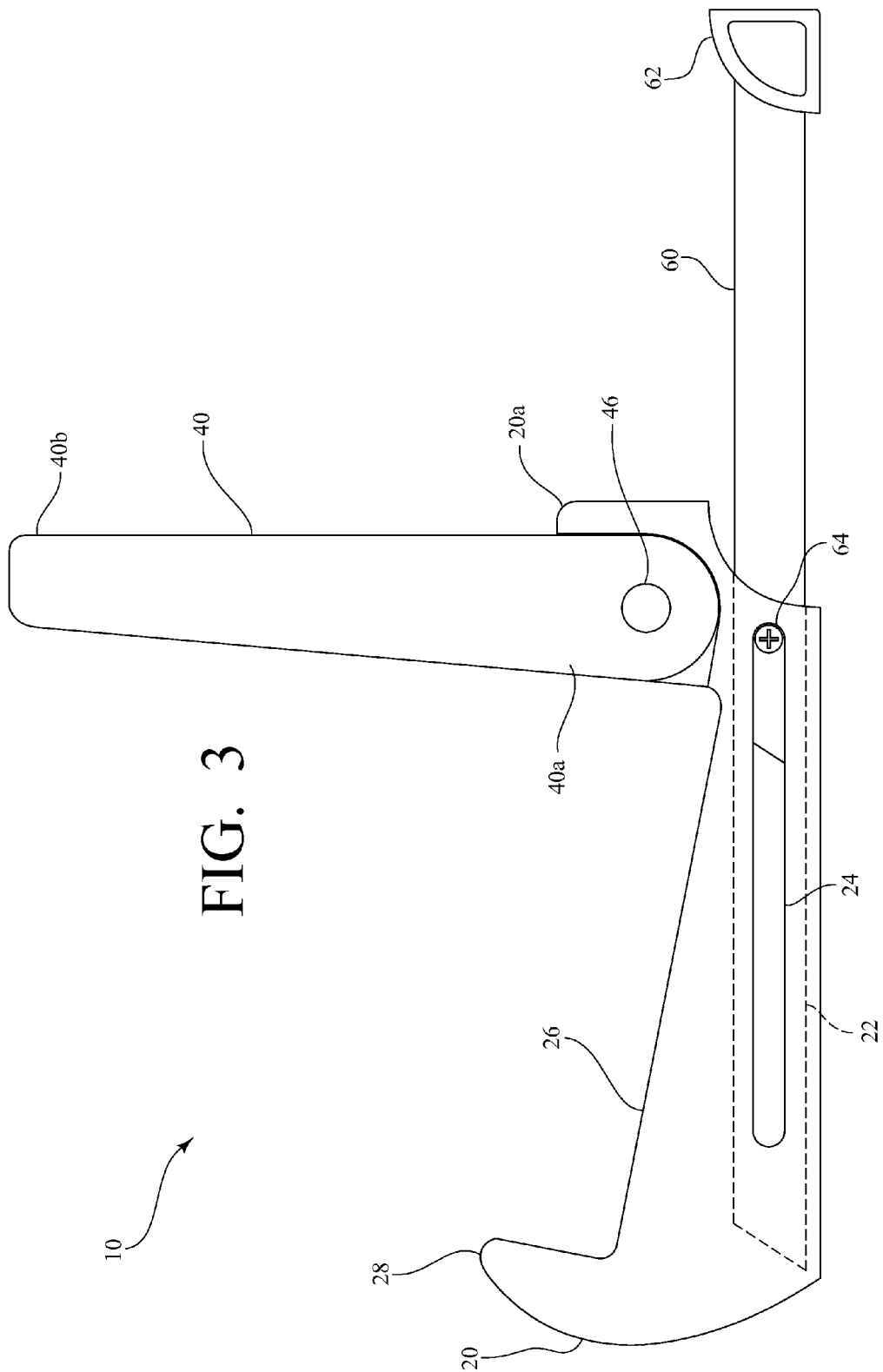
FIG. 3 is a side view of the exemplary stand of FIG. 1 in a deployed position.
Figure 4:
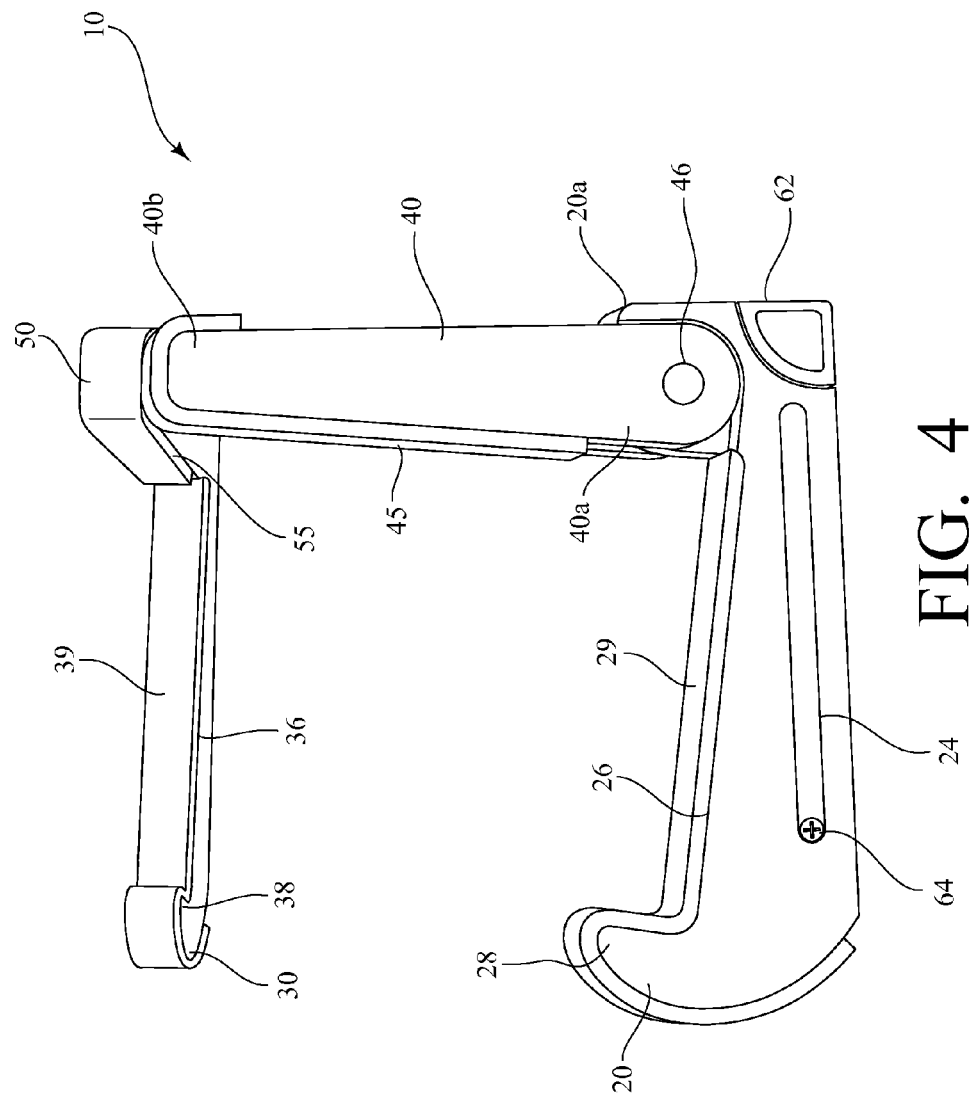
FIG. 4 is a side perspective view of the exemplary stand of FIG. 1 in a partially deployed position, i.e., with the rear legs in a retracted position.
Figure 5:
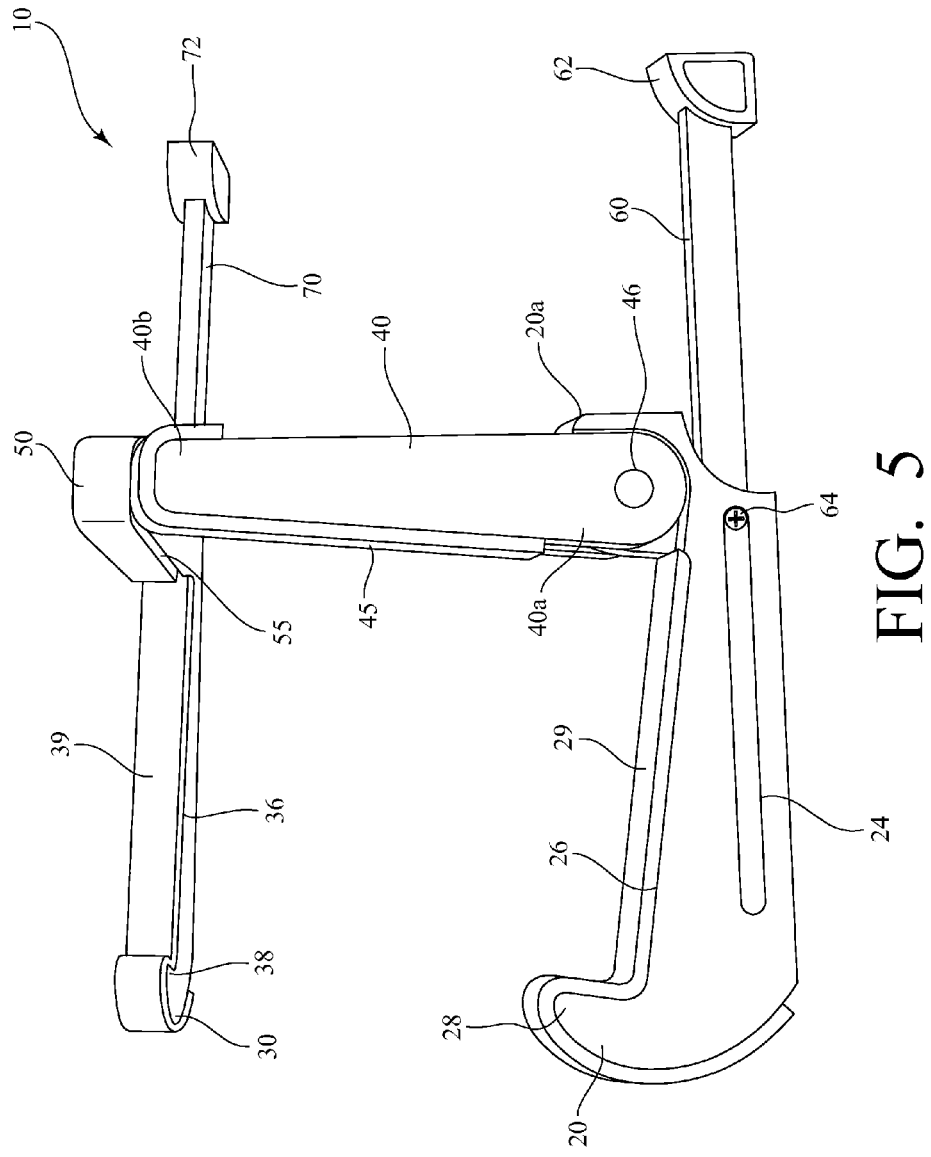
FIG. 5 is a side perspective view of the exemplary stand of FIG. 1 in a deployed position.

FIGS. 1-2 are views of an exemplary portable and collapsible stand 10 made in accordance with the present invention in a collapsed state or storage position, and FIGS. 3-5 are views of the exemplary stand 10 in a deployed position (FIGS. 3 and 5) or a partially deployed position (FIG. 4). As shown in FIGS. 1-5, the exemplary stand 10 includes: two main support legs 20, 30; two vertical support members 40, 50; and two rear legs 60, 70. In this exemplary embodiment, the stand 10 also includes a brace 80.

FIGS. 6a and 6b are views of one of the main support legs 20 of the exemplary stand 10. As shown, the main support leg 20 includes a proximate end 20a that defines a hole 21 to facilitate pivotal movement of the main support leg 20 relative to the vertical support member 40, as is further described below. The main support leg 20 also defines an internal cavity 22 for receiving the rear leg 60, along with a slot 24 defined in the lateral surface of the main support leg 20 and adjacent to the internal cavity 22. The main support leg 20 also defines a support ledge 26 along its upper surface, which terminates at a stop 28 at the distal end of the main support leg 20. Furthermore, the area above the support ledge 26 effectively defines a cavity for receiving the vertical support member 40 when the stand 10 is in a storage position, as is further described below. Finally, as shown in FIGS. 4 and 5, one or more protective strips 29 could be applied to upper surfaces of the main support leg 20, including the support ledge 26. Such protective strips could be made of rubber or other suitable material to provide additional support to a supported object and to prevent the stand 10 from damaging a supported object.

FIGS. 7a and 7b are views of the other of the main support legs 30 of the exemplary stand 10. As shown, the main support leg 30 is substantially identical to the other main support leg 20 and includes a proximate end 30a that defines a hole 31 to facilitate pivoting of the main support leg 30 relative to the vertical support member 50, as is further described below. The main support leg 30 also defines an internal cavity 32 for receiving the rear leg 70, along with a slot 34 defined in the lateral surface of the main support leg 30 and adjacent to the internal cavity 32. The main support leg 30 also defines a support ledge 36 along its upper surface, which terminates at a stop 38 at the distal end of the main support leg 30. Furthermore, the area above the support ledge 36 effectively defines a cavity for receiving the vertical support member 50 when the stand 10 is in a storage position, as is further described below. Finally, as shown in FIGS. 4 and 5, one or more protective strips 39 could be applied to upper surfaces of the main support leg 30, including the support ledge 36. Such protective strips could be made of rubber or other suitable material to provide additional support to a supported object and to prevent the stand 10 from damaging a supported object.

Figure 10A:
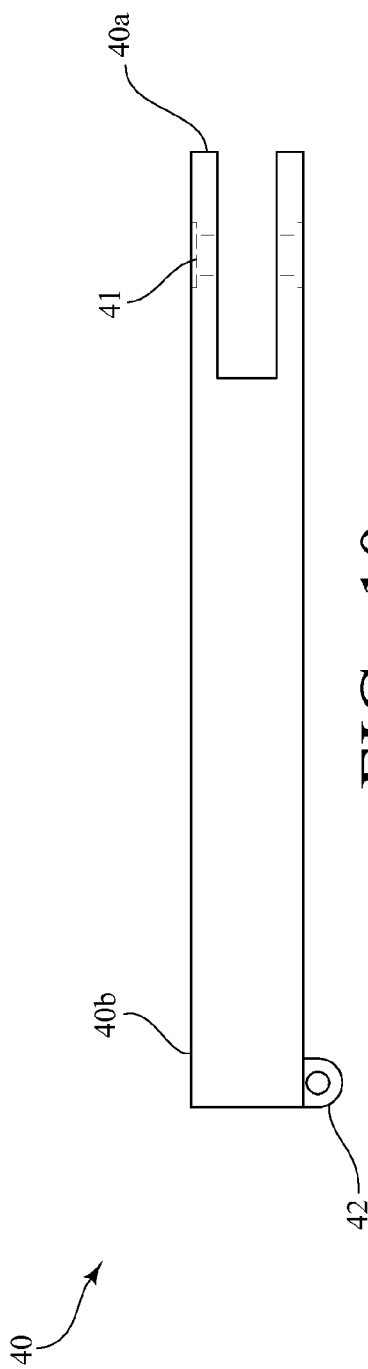
FIGS. 10a and 10b are views of one of the vertical support members of the exemplary stand of FIG. 1.
Figure 10B:
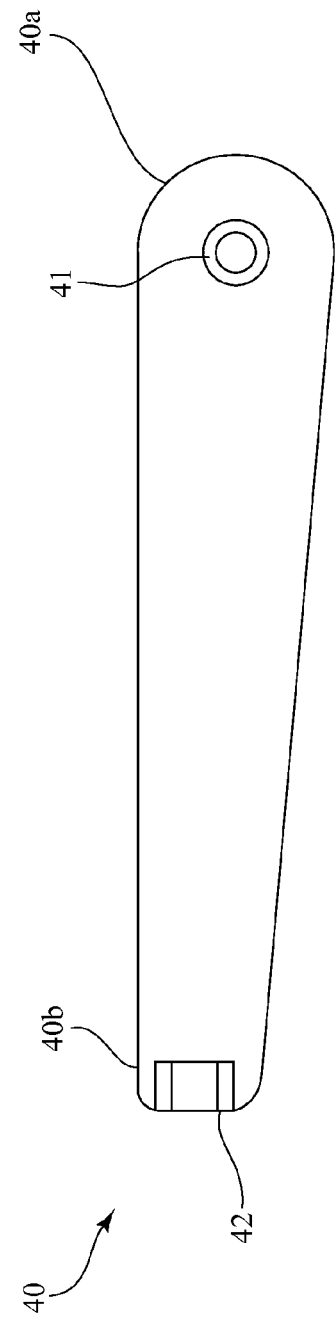

FIGS. 10a and 10b are views of one of the vertical support members 40 of the exemplary stand 10. As shown, the vertical support member 40 has an enlarged end 40a that forms a clevis, with a hole 41 defined through the clevis. The clevis formed by the enlarged end 40a engages the main support leg 20, with the hole 41 being placed in registry with the corresponding hole 21 defined through the main support leg 20, such that a pin can be inserted through the respective holes 41, 21 to facilitate pivotal movement of the main support leg 20 relative to the vertical support member 40, as is further described below. At the opposite end 40b of the vertical support member 40, there is a hinge portion 42 that is secured to the inner surface of the vertical support member 40. Finally, as shown in FIGS. 4 and 5, one or more protective strips 45 could be applied to the upper end of the vertical support member 40. Such protective strips could be made of rubber or other suitable material to provide additional support to a supported object and to prevent the stand 10 from damaging a supported object.

Figure 11A:
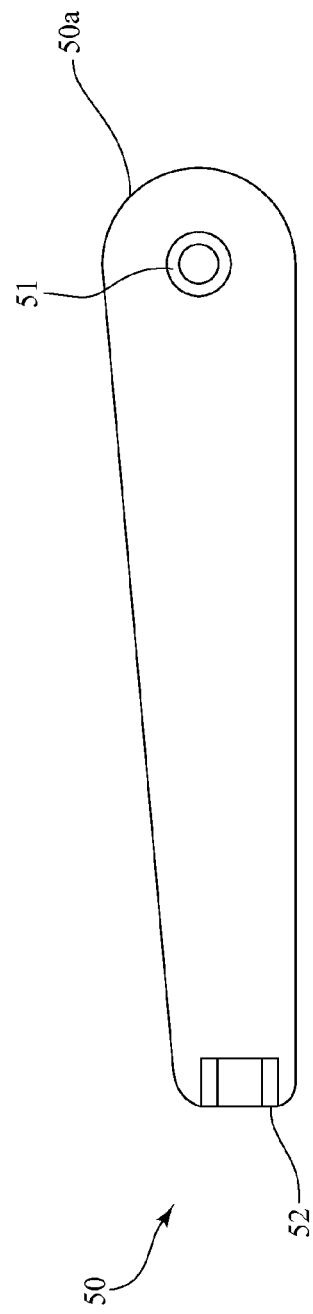
FIGS. 11a and 11b are views of another of the vertical support members of the exemplary stand of FIG. 1.
Figure 11B:
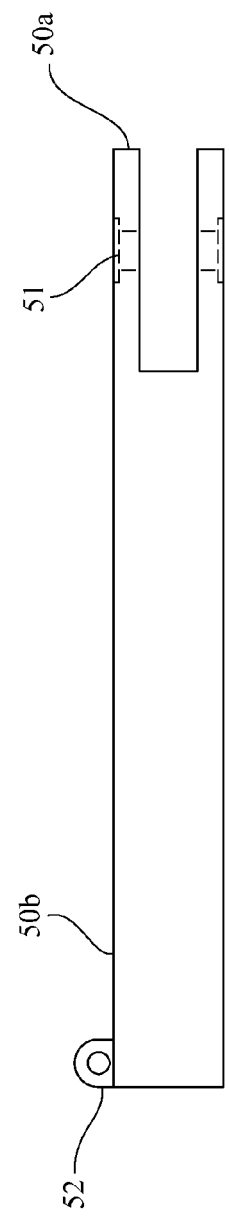

FIGS. 11a and 11b are views of the other of the vertical support members 50 of the exemplary stand 10. As shown, the vertical support member 50 is substantially identical to the other vertical support member 40 and has an enlarged end 50a that forms a clevis, with a hole 51 defined through the clevis. The clevis formed by the enlarged end 50a engages the main support leg 30, with the hole 51 being placed in registry with the corresponding hole 31 defined through the main support leg 30, such that a pin can be inserted through the respective holes 51, 31 to facilitate pivotal movement of the main support leg 30 relative to the vertical support member 50, as is further described below. At the opposite end 50b of the vertical support member 50, there is a hinge portion 52 that is secured to the inner surface of the vertical support member 50. As part of the assembly of the exemplary stand 10, the hinge portion 42 secured to the first vertical support member 40 is operably connected to and engages the hinge portion 52 secured to second vertical support member 50 to create a butt hinge that facilitates pivotal movement of the respective vertical support members 40, 50 relative to one another. Finally, as shown in FIGS. 4 and 5, one or more protective strips 55 could be applied to the upper end of the vertical support member 50. Such protective strips could be made of rubber or other suitable material to provide additional support to a supported object and to prevent the stand 10 from damaging a supported object.

FIGS. 8a and 8b are views of one of the rear legs 60 of the exemplary stand 10. As shown, the rear leg 60 is an elongated member that terminates in a foot 62. A stop 64 extends from a lateral surface of the rear leg 60. The rear leg 60 is received in the internal cavity 22 defined by the main support leg 20 and is configured for sliding movement with respect to the main support leg 20. In this exemplary embodiment, the foot 62 extends outside of the internal cavity 22, and so, the foot 62 can be readily grasped, and the rear leg 60 can be manipulated between a refracted position (FIG. 1) and an extended position (FIG. 3). The stop 64 of the rear leg 60 is received in the slot 24 defined in the lateral surface of the main support leg 20, thus controlling and restricting the sliding movement of the rear leg 60 with respect to the main support leg 20.

FIGS. 9a and 9b are views of the other of the rear legs 70 of the exemplary stand 10. As shown, the rear leg 70 is substantially identical to the other rear leg 60. The rear leg 70 is an elongated member that terminates in a foot 72. A stop 74 extends from a lateral surface of the rear leg 70. The rear leg 70 is received in the internal cavity 32 defined by the main support leg 30 and is configured for sliding movement with respect to the main support leg 30. In this exemplary embodiment, the foot 72 extends outside of the internal cavity 32, and so, the foot 72 can be readily grasped, and the rear leg 60 can be manipulated between a retracted position and an extended position. The stop 74 of the rear leg 70 is received in the slot 34 defined in the lateral surface of the main support leg 30, thus controlling and restricting the sliding movement of the rear leg 70 with respect to the main support leg 30.

Figure 12:
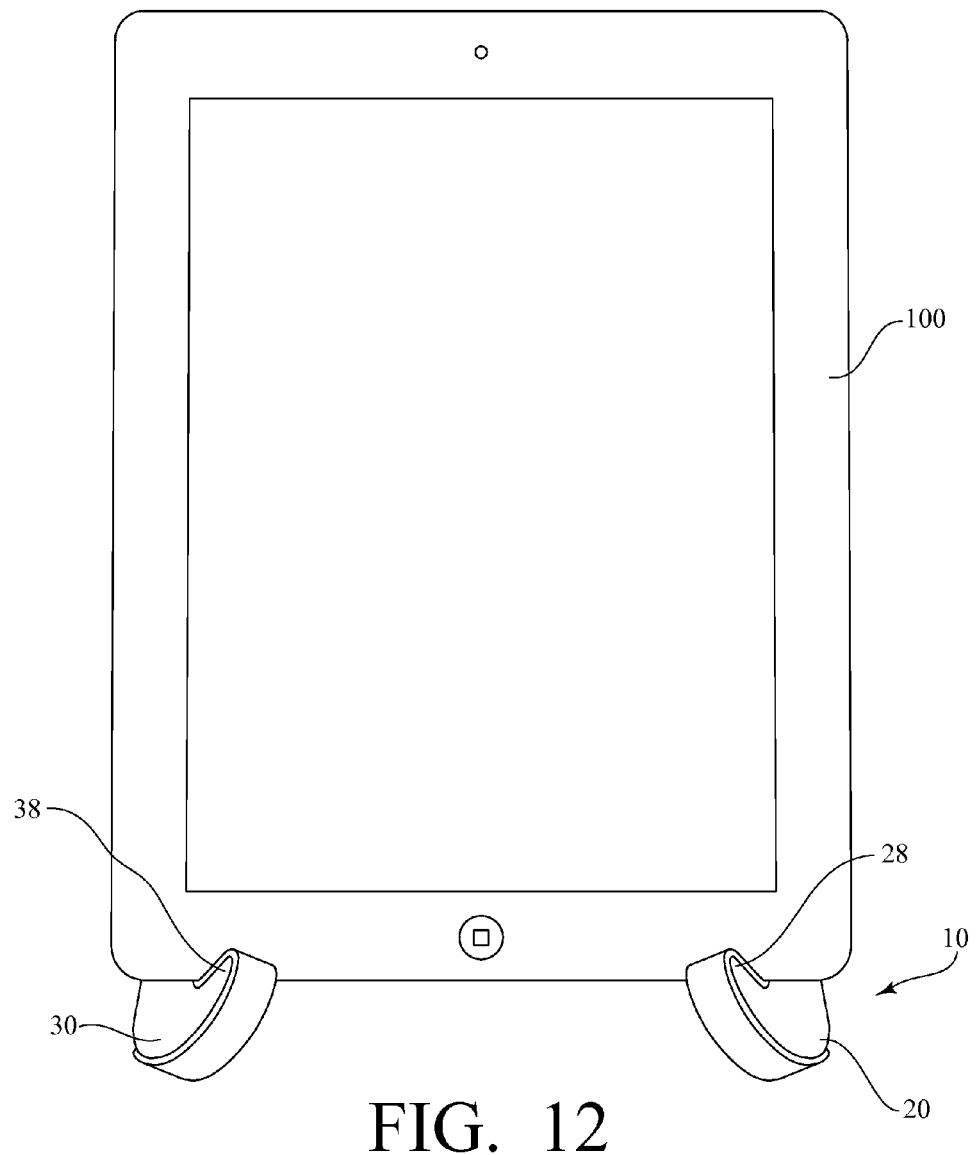
FIG. 12 is a front view of the exemplary stand of FIG. 1 supporting a tablet computer in a portrait orientation.
Figure 13:
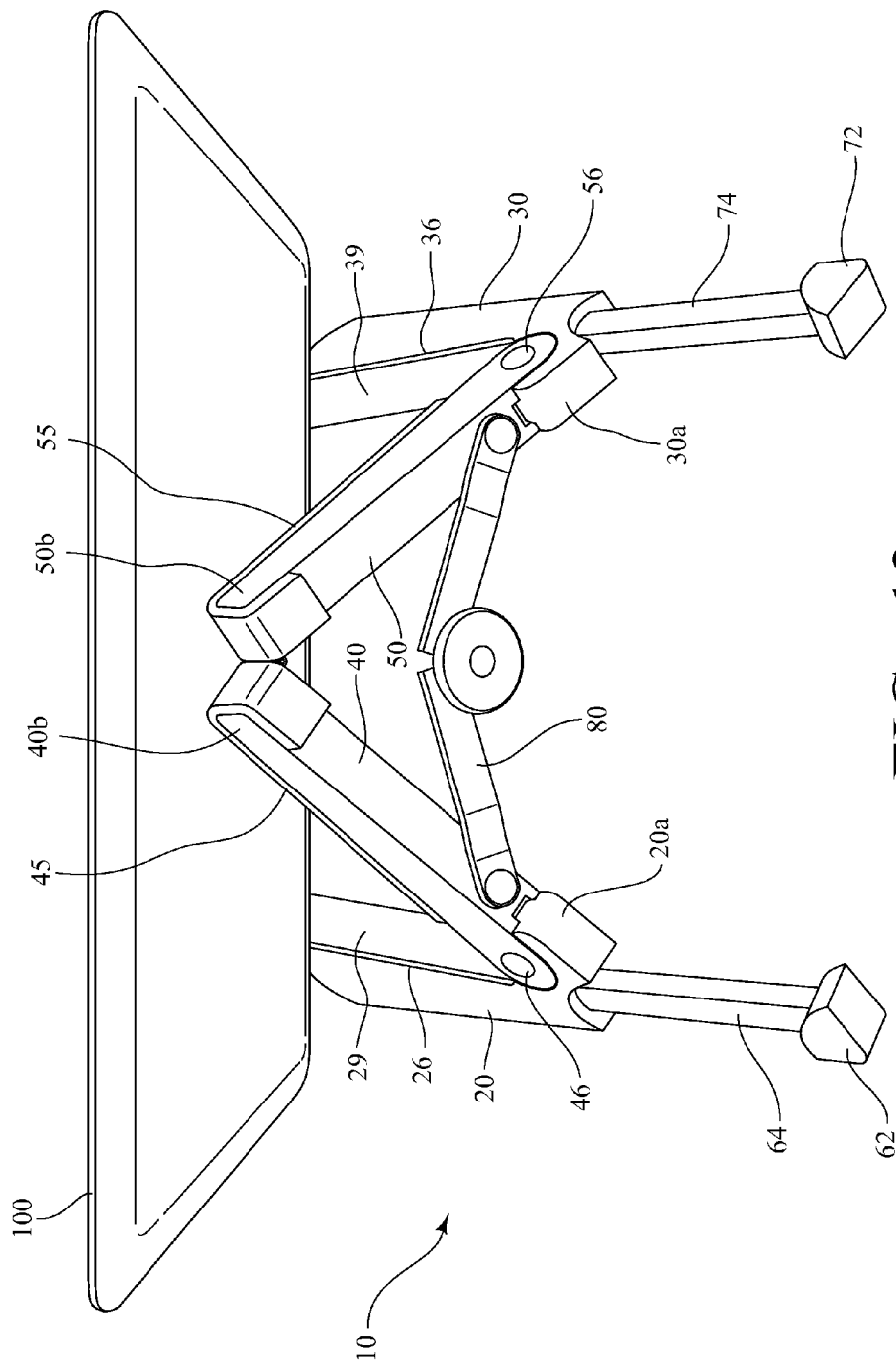
FIG. 13 is a rear view of the exemplary stand of FIG. 1 supporting a tablet computer in a portrait orientation.

Referring now to FIGS. 3-5, on one side of the exemplary stand 10, the main support leg 20 and the vertical support member 40 pivot with respect to one another about a pin 46 received in the hole 41 defined by the vertical support member 40 and the corresponding hole 21 defined through the main support leg 20. Similarly, on the other side of the exemplary stand 10, the main support leg 30 and the vertical support member 50 pivot with respect to one another about a pin 56 (FIG. 13) received in the hole 51 defined by the vertical support member 50 and the corresponding hole 31 defined through the main support leg 30. With respect to such pins, various known mechanical connectors could be used without departing from the spirit and scope of the present invention, including, for example, a screw post or a Chicago screw. The two sides of the exemplary stand 10 are then operably joined together by the butt hinge that connects the respective ends 40b, 50b of the vertical support members 40, 50. Furthermore, the brace 80 extends between and connects the vertical support members 40, 50, as is further described below. Although one exemplary brace 80 is shown in FIGS. 12 and 13, various other braces or mechanical means for connecting the vertical support members 40, 50 to one another, including a locking brace or some form of adjustable brace, could be used without departing from the spirit and scope of the present invention.

Referring again to FIGS. 3 and 5, in a deployed position, each of the main support legs 20, 30 is rotated about the respective axes defined by the pins to a position in which the main support legs 20, 30 engage the underlying ground surface. At the same time, the two vertical support members 40, 50 (which are hinged together) are rotated into an upright orientation. In this regard, each of the main support legs 20, 30 preferably defines a surface that is configured to engage a respective one of the vertical support members 40, 50, thus locking the two vertical support members 40, 50 into the upright orientation. Each of the rear legs 60, 70 is then manipulated into the extended position. Finally, the stand 10 can be spread open, with the brace 80 used to fix the stand 10 into the deployed position.

Once in the deployed position, the exemplary stand 10 provides a stable support for an object, such as a tablet computer. As shown in FIGS. 12 and 13, a tablet computer 100 extends across and is supported on the support ledges 26, 36 of the respective main support legs 20, 30 in a portrait orientation (FIG. 12) or a landscape orientation (FIG. 13). In this exemplary embodiment, the tablet computer 100 is inclined slightly backward, resting against the vertical support members 40, 50, while the stops 28, 38 at the distal ends of the respective main support legs 20, 30 prevent the tablet computer 100 from sliding any further forward.

To return the exemplary stand 10 to a storage position, the brace 80 is unlocked or released. The two vertical support members 40, 50 (which are hinged together) are folded together into an abutting relationship, and then are rotated downward and are received in the cavities defined above the respective support ledges 26, 36 of the main support legs 20, 30. The rear legs 60, 70 are manipulated to the retracted position.

One of ordinary skill in the art will also recognize that additional embodiments and configurations are also possible without departing from the teachings of the present invention or the scope of the claims which follow. This detailed description, and particularly the specific details of the exemplary embodiment disclosed, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. A stand for supporting an object, comprising:
   a first main support leg for engaging an underlying ground surface and including a proximate end defining a hole;
   a first vertical support member including a proximate end defining a hole, with the respective holes defined by the first main support leg and the first vertical support member placed in registry with one another and accommodating a first pin to facilitate pivotal movement of the first main support leg and the first vertical support member relative to each other about an axis defined by the first pin, such that first vertical support member can be rotated relative to the first main support leg to configure the stand in a storage position or a deployed position, in which the first vertical support member is in an upright orientation relative to the first main support leg;
   a second main support leg for engaging the underlying ground surface and including a proximate end defining a hole;
   a second vertical support member including a proximate end defining a hole, with the respective holes defined by the second main support leg and the second vertical support member placed in registry with one another and accommodating a second pin to facilitate pivotal movement of the second main support leg and the second vertical support member relative to each other about an axis defined by the second pin, such that second vertical support member can be rotated relative to the second main support leg to configure the stand in the storage position or the deployed position, in which the second vertical support member is in an upright orientation relative to the second main support leg;
   a hinge that operably joins the first vertical support member to the second vertical support member;
   a first rear leg configured for sliding movement relative to the first main support leg between a refracted position and an extended position; and
   a second rear leg configured for sliding movement relative to the second main support leg between a retracted position and an extended position;
   wherein the first rear leg is received in an internal cavity defined by the first main support leg, and wherein the second rear leg is received in an internal cavity defined by the second main support leg; and
   wherein the first main support leg further defines a slot in a lateral surface thereof and adjacent to the internal cavity, and wherein a first stop extends from a lateral surface of the first rear leg and is received in the slot defined by the first main support leg, thus controlling and restricting the sliding movement of the first rear leg with respect to the first main support leg.

2. The stand as recited in claim 1, wherein, in the storage position, the first vertical support member is received in a cavity defined by the first main support leg, and the second vertical support member is received in a cavity defined by the second main support leg.

3. The stand as recited in claim 1, wherein, in the storage position, the first vertical support member and the second vertical support member are folded together into an abutting relationship.

4. The stand as recited in claim 1, wherein the second main support leg further defines a slot in a lateral surface thereof and adjacent to the internal cavity, and wherein a second stop extends from a lateral surface of the second rear leg and is received in the slot defined by the second main support leg, thus controlling and restricting the sliding movement of the second rear leg with respect to the second main support leg.

5. The stand as recited in claim 1, wherein the first main support leg defines a support ledge along its upper surface, which terminates at a stop at a distal end of the first main support leg, and wherein the second main support leg also defines a support ledge along its upper surface, which terminates at a stop at a distal end of the second main support leg.

6. The stand as recited in claim 1, wherein the proximate end of the first vertical support member forms a clevis, with the clevis engaging the proximate end of the first main support leg, and wherein the proximate end of the second vertical support member forms a clevis, with the clevis engaging the proximate end of the second main support leg.

7. The stand as recited in claim 1, wherein the first rear leg is an elongated member that terminates in a foot, and wherein the second rear leg is an elongated member that terminates in a foot.

8. The stand as recited in claim 1, and further comprising a brace that extends between and connects the first vertical support member and the second vertical support member, wherein the brace is used to fix the stand into the deployed position.

9. A stand for supporting an object, comprising:
   a first main support leg for engaging an underlying ground surface and including a proximate end;
   a first vertical support member pivotally connected to the proximate end of the first main support leg, such that the first vertical support member can be rotated relative to the first main support leg to configure the stand in a storage position or a deployed position, in which the first vertical support member is in an upright orientation relative to the first main support leg;
   a second main support leg for engaging the underlying ground surface and including a proximate end;
   a second vertical support member pivotally connected to the proximate end of the second main support leg, such that the second vertical support member can be rotated relative to the second main support leg to configure the stand in the storage position or the deployed position, in which the second vertical support member is in an upright orientation relative to the second main support leg;
   a hinge that operably joins the first vertical support member to the second vertical support member;
   a first rear leg configured for sliding movement relative to the first main support leg between a refracted position and an extended position; and
   a second rear leg configured for sliding movement relative to the second main support leg between a retracted position and an extended positions;
   wherein the first rear leg is received in an internal cavity defined by the first main support leg, and wherein the second rear leg is received in an internal cavity defined by the second main support leg; and
   wherein the first main support leg further defines a slot in a lateral surface thereof and adjacent to the internal cavity, and wherein a first stop extends from a lateral surface of the first rear leg and is received in the slot defined by the first main support leg, thus controlling and restricting the sliding movement of the first rear leg with respect to the first main support leg.

10. The stand as recited in claim 9, wherein, in the storage position, the first vertical support member is received in a cavity defined by the first main support leg, and the second vertical support member is and received in a cavity defined by the second main support leg.

11. The stand as recited in claim 9, wherein, in the deployed position, the first vertical support member and the second vertical support member are rotated into an upright orientation.

12. The stand as recited in claim 9, wherein the second main support leg further defines a slot in a lateral surface thereof and adjacent to the internal cavity, and wherein a second stop extends from a lateral surface of the second rear leg and is received in the slot defined by the second main support leg, thus controlling and restricting the sliding movement of the second rear leg with respect to the second main support leg.

13. The stand as recited in claim 9, wherein the first main support leg defines a support ledge along its upper surface, which terminates at a stop at a distal end of the first main support leg, and wherein the second main support leg also defines a support ledge along its upper surface, which terminates at a stop at a distal end of the second main support leg.

14. The stand as recited in claim 9, wherein the proximate end of the first vertical support member forms a clevis, with the clevis engaging the proximate end of the first main support leg, and wherein the proximate end of the second vertical support member forms a clevis, with the clevis engaging the proximate end of the second main support leg.

15. The stand as recited in claim 9, wherein the first rear leg is an elongated member that terminates in a foot, and wherein the second rear leg is an elongated member that terminates in a foot.

16. The stand as recited in claim 9, and further comprising a brace that extends between and connects the first vertical support member and the second vertical support member, wherein the brace is used to fix the stand into the deployed position.

17. A stand for supporting an object, comprising:
a first subassembly including a first main support leg for engaging an underlying ground surface, a first vertical support member, and a first rear leg; and
a second subassembly including a second main support leg for engaging an underlying ground surface, a second vertical support member, and a second rear leg;
wherein the first main support leg and the first vertical support member are mounted for pivotal movement relative to one another to configure the stand in a storage position or a deployed position, in which the first vertical support member is in an upright orientation relative to the first main support leg;
wherein the second main support leg and the second vertical support member are mounted for pivotal movement relative to one another to configure the stand in the storage position or the deployed position, in which the second vertical support member is in an upright orientation relative to the second main support leg;
wherein the first rear leg is received in an internal cavity defined by the first main support leg and is configured for sliding movement relative to the first main support leg between a retracted position and an extended position, and wherein the first main support leg further defines a slot in a lateral surface thereof and adjacent to the internal cavity, and wherein a first stop extends from a lateral surface of the first rear leg and is received in the slot defined by the first main support leg, thus controlling and restricting the sliding movement of the first rear leg with respect to the first main support leg; and
wherein the second rear leg is received in an internal cavity defined by the second main support leg and is configured for sliding movement relative to the second main support leg between a refracted position and an extended position, wherein the second main support leg further defines a slot in a lateral surface thereof and adjacent to the internal cavity, and wherein a second stop extends from a lateral surface of the second rear leg and is received in the slot defined by the second main support leg, thus controlling and restricting the sliding movement of the second rear leg with respect to the second main support leg.

18. The stand as recited in claim 17, wherein the first subassembly and the second subassembly are operably joined together by a hinge that connects the first vertical support member and the second vertical support member.

* * * * *

UNITED STATES PATENT AND TRADEMARK OFFICE
CERTIFICATE OF CORRECTION

PATENT NO.        : 9,010,701 B1
APPLICATION NO.   : 14/191931
DATED             : April 21, 2015
INVENTOR(S)       : Cooper Page 1 of 1

It is certified that error appears in the above-identified patent and that said Letters Patent is hereby corrected as shown below:

IN THE CLAIMS:

Claim 1, col. 7, line 47, change "refracted" to "retracted"

Claim 9, col. 8, line 60, change "positions" to "position"

Signed and Sealed this
Third Day of November, 2015

Michelle K. Lee
*Director of the United States Patent and Trademark Office*